United States Patent [19]

Yokota

[11] Patent Number: 4,721,372

[45] Date of Patent: Jan. 26, 1988

[54] OBJECTIVE LENS SYSTEM FOR AN ENDOSCOPE

[75] Inventor: Akira Yokota, Tokyo, Japan

[73] Assignee: Olympus Optical Co., Ltd., Tokyo, Japan

[21] Appl. No.: 716,132

[22] Filed: Mar. 26, 1985

[30] Foreign Application Priority Data

Mar. 28, 1984 [JP] Japan ................................ 59-58368

[51] Int. Cl.⁴ .................... G02B 9/62; G02B 21/02
[52] U.S. Cl. ................................. 350/464; 350/414
[58] Field of Search .............................. 350/464, 414

[56] References Cited

U.S. PATENT DOCUMENTS

| | | | |
|---|---|---|---|
| 3,524,694 | 8/1970 | Klein | 350/414 |
| 3,711,186 | 1/1973 | O'Connor | 350/414 |
| 4,312,572 | 1/1982 | Yamashita et al. | 350/464 |
| 4,591,243 | 5/1986 | Yamagishi | 350/464 X |

FOREIGN PATENT DOCUMENTS

| | | |
|---|---|---|
| 48-31555 | 9/1973 | Japan . |
| 51-49823 | 12/1976 | Japan . |
| 55-90928 | 7/1980 | Japan . |
| 57-20168 | 4/1982 | Japan . |

*Primary Examiner*—John K. Corbin
*Assistant Examiner*—Scott J. Sugarman
*Attorney, Agent, or Firm*—Cushman, Darby & Cushman

[57] ABSTRACT

An objective lens system for an endoscope comprising a first lens component arranged as a positive meniscus lens, a second lens component arranged as a biconvex lens, a third lens component arranged as a positive cemented doublet, a fourth lens component arranged as a positive cemented doublet, a fifth lens component arranged as a negative cemented doublet, and a sixth lens component arranged as a negative cemented doublet, the objective lens system for an endoscope being arranged that the magnification is high, i.e., 30X to 40X, and aberrations are corrected favorably.

6 Claims, 5 Drawing Figures

OBJECTIVE LENS SYSTEM FOR AN ENDOSCOPE

BACKGROUND OF THE INVENTION (a) Field of the Invention

The present invention relates to an objective lens system for an endoscope and, more particularly, to an objective lens system for an endoscope with an extremely high magnification (for example, from 30× to 40×).

(b) Description of the Prior Art

By endoscopes, observation by magnifying the object is being performed in recent years and, moreover, there is increasing demand for observation at a very high magnification at a level similar to observation by microscopes. Among known objective lens systems for endoscopes of magnifications 10× to 30× for ordinary observation, there are so-called variable magnification lens systems which are arranged that the lenses constituting the lens system are partially shifted along the optical axis of the objective so that it is possible to observe the object by further enlarging it, as the objective lens system approaches the object, by making the magnification higher than those of ordinary objective lens systems. However, in case of those lens systems, the magnification of the objective lens system itself is less than 2× even when the objective lens system is put to the position where the distance to the object is the shortest and, in practice, the magnification of the optical system as a whole is made high by multiplying the magnification of the eyepiece so that the magnification of the endoscope as a whole becomes 10× to 30× as mentioned in the above.

Among known endoscopes for microscopic observation, there is no endoscope which is designed for the purpose of observation at a high magnification only, and there are only such endoscopes which are arranged that observation at a high magnification is made possible by the way of use.

The above-mentioned way of use is to use an endoscope composed as shown in FIG. 1 of the present application like the endoscope disclosed in Japanese published examined patent application No. 31555/73. That is, in a distal end 1 of an endoscope, an objective lens system 2 and cover glass 3 are arranged as shown in FIG. 1, an optical fiber bundle 4 for observation is arranged in rear of the objective lens system 2, an optical fiber bundle 5 for illumination is arranged in parallel with the optical fiber bumdle 4 for observation, and the endoscope optical system is composed of them. Observation by the above-mentioned endoscope optical system is performed by putting the outer surface 3a of the cover glass 3 into direct contact with a mucous membrane surface 6. Besides, fixing needles 7 are provided to the front surface 1a of the distal end 1 in order to keep the distal end stable when the front end (cover glass 3) of the endoscope is put into close contact with the mucous membrane surface 6. As another way of use, Japanese published examined utility model applications No. 49823/76 and No. 20168/82 disclose such endoscopes arranged that a miniature microscope, which comprises an objective lens system, an optical fiber bundle for observation, and an eyepiece, is inserted into an inserting passage of an endoscope, which comprises an observation optical system, an illumination optical system, and an inserting passage, in order to observe an object at a high magnification.

The documents of known endoscopes cited in the above do not disclose any concrete example of an objective lens system having high magnification. Besides, up to the present, there exists no known objective lens system for an endoscope having a high magnification.

SUMMARY OF THE INVENTION

It is, therefore, a primary object of the present invention to provide an objective lens system for an endoscope with NA about 0.5 of which the magnification is high, i.e., 30× to 40×, and aberrations are corrected favourably.

Generally, endoscopes are arranged that the outer diameter thereof is about 10 mm at the maximum in order to reduce the pain of the patient. Out of the above-mentioned outer diameter, the space to be occupied by the outer diameter of an objective lens system is about 3 mm at the maximum, and the diameter of an image guide is limited to about 2 mm. For example, when the size of a field stop arranged at the entrance end face of an optical fiber bundle for observation is 2 mm, the height of object is about 0.03 mm when it is attempted to form an image of magnification 30× by an objective lens system.

The objective lens system for an endoscope according to the present invention has a lens configuration as shown in FIG. 2. The objective lens system shown in FIG. 2 comprises a front lens group I comprising four lens components and arranged as a positive lens group, and a rear lens group II comprising two lens components and arranged as a negative lens group. Besides, the objective lens system shown in FIG. 2 is arranged that the pupil thereof is located at a position between the fourth lens component constituting the front lens group I and the lens component arranged on the extremely object side in the rear lens group II (i.e., the fifth lens component). That is, the objective lens system shown in FIG. 2 comprises a front lens group I comprising a first lens component arranged as a positive meniscus lens which is concave toward the object side, a second lens component arranged as a positive lens, a third lens component arranged as a positive cemented doublet consisting of a positive lens element and a negative lens element which are cemented together, and a fourth lens component arranged as a positive cemented doublet consisting of a positive lens element and a negative lens element which are cemented together, and a second lens group II comprises a fifth lens component arranged as a negative cemented doublet consisting of a negative lens element and a positive lens element which are cemented together, and a sixth lens component arraged as a negative cemented meniscus doublet consisting of a positive lens element and a negative lens element which are cemented together and arranged to be concave toward the image side.

The above-mentioned objective lens system shown in FIG. 2 does not cause much distortion because the field angle is small and because of the lens type adopted and, at the same time, causes very small astigmatism due to the same reasons. As for spherical aberration and coma, both of paraxial aberrations and offaxial aberrations are caused at the same surfaces in the lens system because both of paraxial rays and offaxial rays pass respective lens surfaces at positions of heights of rays which are not so different from each other as it will be understood when paraxial rays of offaxial rays are traced roughly. Therefore, when spherical aberration which has large influence on the quality of image is corrected favourably, coma is also corrected favourably. The conditions (1), (2) and (3) shown below are established in order to correct spherical aberration and coma favourably.

$$0.05/f \leq (n_4 - n_5)/r_8 \leq 0.08/f \quad (1)$$

$$0.03/f \leq (n_6 - n_7)/r_{11} \leq 0.06/f \quad (2)$$

$$0.1/f \leq (n_9 - n_8)/r_{14} \leq 0.15/f \quad (3)$$

In the conditions (1), (2) and (3) shown in the above, reference symbol f represents the focal length of the lens system as a whole, reference symbols $n_4$ and $n_5$ respectively represent refractive indices of respective lens elements constituting the third lens component, reference symbols $n_6$ and $n_7$ respectively represent refractive indices of respective lens elements constituting the fourth lens component, reference symbols $n_8$ and $n_9$ respectively represent refractive indices of respective lens elements constituting the fifth lens component, reference symbol $r_8$ represents the radius of curvature of the cemented surface in the third lens component, reference symbol $r_{11}$ represents the radius of curvature of the cemented surface in the fourth lens component, and reference symbol $r_{14}$ represents the radius of curvature of the cemented surface in the fifth lens component.

The conditions (1), (2) and (3) respectively define the refractive powers of the cemented surfaces in the cemented doublets respectively constituting the third, fourth and fifth lens components. In other words, said conditions respectively define the refractive powers of the surfaces $r_8$, $r_{11}$ and $r_{14}$. Each of said cemented surfaces has negative refractive action for rays, and spherical aberration and coma caused thereby have positive values. Therefore, if any of the values defined by the conditions (1), (2) and (3) becomes larger than the upper limit thereof, spherical aberration and coma will be overcorrected. If any of the values defined by the conditions (1), (2) and (3) becomes smaller than the lower limit thereof, spherical aberration and coma will be undercorrected. In either case, it is impossible to obtain a favourable image.

Now, the correction between longitudinal chromatic aberration and lateral chromatic aberration in said conditions (1), (2) and (3) is described below. As explained before, the pupil of said lens system is located at a position between the fourth lens component and the fifth lens component. From the object to the position of the pupil, inclination angles of offaxial principal rays are small. Here, when upper rays and lower rays are also taken into consideration, rays do not become asymmetrical so much in the meridional plane. Therefore, powers of the cemented surfaces have larger influence on longitudinal chromatic aberration than on lateral chromatic aberration. This means that the conditions (1) and (2) serve also for correction of longitudinal chromatic aberration. That is, longitudinal chromatic aberration will be undercorrected if either of the values defined by the conditions (1) and (2) becomes smaller than the lower limit thereof and will be overcorrected if either of them becomes larger than the upper limit thereof.

From the position of the pupil to the image surface, the lens elements have comparatively strong negative powers and, therefore, offaxial principal rays are largely refracted in the portion toward the image surface. Consequently, rays become asymmetrical in the meridional plane, and powers of the cemented surfaces have larger influence on lateral chromatic aberration than on longitudinal chromatic aberration. This means that the condition (3) serves also for correction of lateral chromatic aberration. That is, lateral chromatic aberration will be overcorrected if the value defined by the condition (3) becomes larger than the upper limit thereof and power of the cemented surface in the fifth lens component becomes strong and will be undercorrected if the value defined by the condition (3) becomes smaller than the lower limit thereof and power of said cemented surface becomes weak.

To correct chromatic aberration of the objective lens system for an endoscope according to the present invention more favourably, it is preferable to further fulfill the conditions (4), (5) and (6) shown below:

$$\nu_4 - \nu_5 \geq 55 \quad (4)$$

$$\nu_6 - \nu_7 \geq 50 \quad (5)$$

$$\nu_9 - \nu_8 \geq 50 \quad (6)$$

where, reference symbols $\nu_4$ and $\nu_5$ respectively represent Abbe's numbers of respective lens elements constituting the third lens component, reference symbols $\nu_6$ and $\nu_7$ respectively represent Abbe's numbers of respective lens elements constituting the fourth lens component, and reference symbols $\nu_8$ and $\nu_9$ respectively represent Abbe's numbers of respective lens elements constituting the fifth lens component.

Out of respective conditions shown in the above, the conditions (4) and (5) relate to correction of longitudinal chromatic aberration. If either of the values defined by the conditions (4) and (5) becomes smaller than the lower limit thereof, longitudinal chromatic aberration becomes unfavourable.

The condition (6) relates to correction of lateral chromatic aberration. If the value defined by the condition (6) becomes smaller than the lower limit thereof, lateral chromatic aberration becomes unfavourable.

Besides, to correct curvature of field favourably, it is preferable to arrange that the objective lens system for endoscopes according to the present invention further fulfills the conditions (7) and (8) shown below:

$$-5.0f \leq r_{13} \leq -3.0f \quad (7)$$

$$1.1f \leq r_{18} \leq 1.4f \quad (8)$$

where, reference symbol $r_{13}$ represents the radius of curvature of the surface on the object side of the fifth lens component, and reference symbol $r_{18}$ represents the radius of curvature of the surface on the image side of the sixth lens component.

The conditions (7) and (8) shown in the above respectively define radii of curvature of the foremost surface (surface closest to the object side) and the rearmost surface (surface closest to the image side) of the rear lens group (comprising the fifth and sixth lens components). As it is evident when Seidel's coefficients are taken into consideration, the above-mentioned two surfaces have the largest influence on correction of Petzval's sum. When radii of curvature of said surfaces are small, curvature of field are undercorrected. On the contrary, when radii of curvature of said surfaces are large, curvature of field are overcorrected. That is, if $r_{13}$ becomes larger than the upper limit of the condition (7) or $r_{18}$ becomes smaller than the lower limit of the condition (8), curvature of field will be undercorrected. If $r_{13}$ becomes smaller than the lower limit of the condition (7) or $r_{18}$ becomes larger than the upper limit of the condition (8), curvature of field will be overcorrected.

DETAILED DESCRIPTION OF THE PREFERRED EMBODIMENTS

Figure 1:
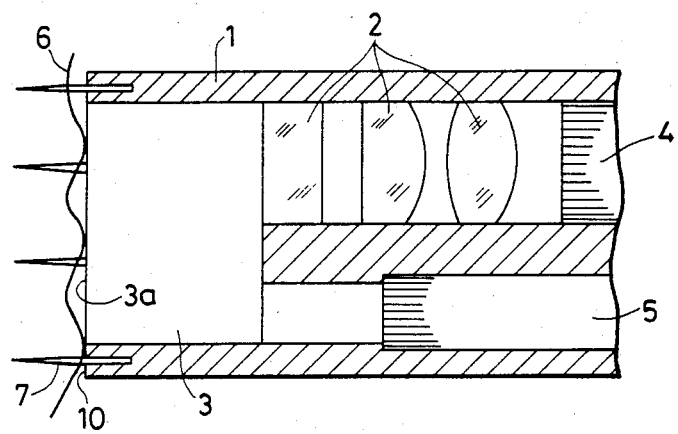
FIG. 1 shows a sectional view illustration composition of a distal end of an endoscope.

Now, preferred embodiments of the objective lens system for an endoscope according to the present invention are shown below.

---

Embodiment 1
$f = 1.0$, NA = 0.5, $\beta = -27.42X$, IH = 1.3435

| | | | |
|---|---|---|---|
| $r_1 = \infty$ | | | |
| | $d_1 = 1.385$ | $n_1 = 1.51633$ | $\nu_1 = 64.15$ |
| $r_2 = \infty$ | | | |
| | $d_2 = 1.7313$ | | |
| $r_3 = -3.7978$ | | | |
| | $d_3 = 0.7756$ | $n_2 = 1.755$ | $\nu_2 = 52.33$ |
| $r_4 = -2.5512$ | | | |
| | $d_4 = 0.1662$ | | |
| $r_5 = 7.9003$ | | | |
| | $d_5 = 1.662$ | $n_3 = 1.497$ | $\nu_3 = 81.61$ |
| $r_6 = -4.9723$ | | | |
| | $d_6 = 0.4571$ | | |
| $r_7 = 6.8767$ | | | |
| | $d_7 = 1.662$ | $n_4 = 1.43389$ | $\nu_4 = 95.15$ |
| $r_8 = -3.4598$ | | | |
| | $d_8 = 0.6925$ | $n_5 = 1.64769$ | $\nu_5 = 33.80$ |
| $r_9 = -6.7756$ | | | |
| | $d_9 = 0.4155$ | | |
| $r_{10} = 3.9211$ | | | |
| | $d_{10} = 1.2742$ | $n_6 = 1.497$ | $\nu_6 = 81.61$ |
| $r_{11} = -5.464$ | | | |
| | $d_{11} = 0.554$ | $n_7 = 1.74077$ | $\nu_7 = 27.79$ |
| $r_{12} = 10.0734$ | | | |
| | $d_{12} = 1.2881$ | | |
| $r_{13} = -4.0748$ | | | |
| | $d_{13} = 0.4155$ | $n_8 = 1.71736$ | $\nu_8 = 29.51$ |
| $r_{14} = 1.8283$ | | | |
| | $d_{14} = 0.831$ | $n_9 = 1.497$ | $\nu_9 = 81.61$ |
| $r_{15} = 7.9155$ | | | |
| | $d_{15} = 0.1385$ | | |
| $r_{16} = 2.1662$ | | | |
| | $d_{16} = 1.3158$ | $n_{10} = 1.7618$ | $\nu_{10} = 27.11$ |
| $r_{17} = -1.795$ | | | |
| | $d_{17} = 0.8033$ | $n_{11} = 1.6935$ | $\nu_{11} = 53.23$ |
| $r_{18} = 1.2922$ | | | |

$$\frac{n_4 - n_5}{r_8} = 0.0618 \qquad \frac{n_6 - n_7}{r_{11}} = 0.0446$$

$$\frac{n_9 - n_8}{r_{14}} = 0.1205$$

$\nu_4 - \nu_5 = 61.35 \qquad r_{13} = -4.0748$
$\nu_6 - \nu_7 = 53.82 \qquad r_{18} = 1.2922$
$\nu_9 - \nu_8 = 52.1$

---

Embodiment 2
$f = 1.0$, NA = 0.5, $\beta = -30.828X$, IH = 1.5461

| | | | |
|---|---|---|---|
| $r_1 = \infty$ | | | |
| | $d_1 = 2.391$ | $n_1 = 1.51633$ | $\nu_1 = 64.15$ |
| $r_2 = \infty$ | | | |
| | $d_2 = 1.5462$ | | |
| $r_3 = -4.4486$ | | | |
| | $d_3 = 0.8927$ | $n_2 = 1.755$ | $\nu_2 = 52.33$ |
| $r_4 = -3.3053$ | | | |
| | $d_4 = 0.1914$ | | |
| $r_5 = 8.2555$ | | | |
| | $d_5 = 1.9128$ | $n_3 = 1.49782$ | $\nu_3 = 66.83$ |
| $r_6 = -5.2121$ | | | |
| | $d_6 = 0.526$ | | |
| $r_7 = 6.5355$ | | | |
| | $d_7 = 1.9128$ | $n_4 = 1.43389$ | $\nu_4 = 95.15$ |
| $r_8 = -3.662$ | | | |
| | $d_8 = 0.797$ | $n_5 = 1.65016$ | $\nu_5 = 39.39$ |
| $r_9 = -7.9534$ | | | |
| | $d_9 = 0.4781$ | | |
| $r_{10} = 4.323$ | | | |
| | $d_{10} = 1.4665$ | $n_6 = 1.497$ | $\nu_6 = 81.61$ |
| $r_{11} = -5.534$ | | | |
| | $d_{11} = 0.6377$ | $n_7 = 1.74077$ | $\nu_7 = 27.79$ |
| $r_{12} = 12.0791$ | | | |
| | $d_{12} = 1.7534$ | | |
| $r_{13} = -3.905$ | | | |
| | $d_{13} = 0.4781$ | $n_8 = 1.71736$ | $\nu_8 = 29.51$ |
| $r_{14} = 1.6997$ | | | |
| | $d_{14} = 0.9555$ | $n_9 = 1.497$ | $\nu_9 = 61.61$ |
| $r_{15} = 4.7794$ | | | |
| | $d_{15} = 0.1572$ | | |
| $r_{16} = 2.0721$ | | | |
| | $d_{16} = 1.5129$ | $n_{10} = 1.7618$ | $\nu_{10} = 27.11$ |
| $r_{17} = -2.3009$ | | | |
| | $d_{17} = 0.9227$ | $n_{11} = 1.6935$ | $\nu_{11} = 53.23$ |
| $r_{18} = 1.3757$ | | | |

$$\frac{n_4 - n_5}{r_8} = 0.0591 \qquad \frac{n_6 - n_7}{r_{11}} = 0.044$$

$$\frac{n_9 - n_8}{r_{14}} = 0.1296$$

$\nu_4 - \nu_5 = 55.76 \qquad r_{13} = -3.905$
$\nu_6 - \nu_7 = 53.82 \qquad r_{18} = 1.3757$
$\nu_9 - \nu_8 = 52.1$

---

Embodiment 3
$f = 1.0$, NA = 0.5, $\beta = -40X$, IH = 1.4176

| | | | |
|---|---|---|---|
| $r_1 = \infty$ | | | |
| | $d_1 = 2.006$ | $n_1 = 1.51633$ | $\nu_1 = 64.15$ |
| $r_2 = \infty$ | | | |
| | $d_2 = 0.9168$ | | |
| $r_3 = -3.4978$ | | | |
| | $d_3 = 0.6996$ | $n_2 = 1.72916$ | $\nu_2 = 54.68$ |
| $r_4 = -2.3121$ | | | |
| | $d_4 = 0.1337$ | | |
| $r_5 = 7.486$ | | | |
| | $d_5 = 1.1114$ | $n_3 = 1.497$ | $\nu_3 = 81.61$ |
| $r_6 = -4.8326$ | | | |
| | $d_6 = 0.403$ | | |
| $r_7 = 5.9694$ | | | |
| | $d_7 = 1.4327$ | $n_4 = 1.43389$ | $\nu_4 = 95.15$ |
| $r_8 = -3.2278$ | | | |
| | $d_8 = 0.4307$ | $n_5 = 1.64769$ | $\nu_5 = 33.8$ |
| $r_9 = -5.5916$ | | | |
| | $d_9 = 0.4042$ | | |
| $r_{10} = 3.934$ | | | |
| | $d_{10} = 1.2198$ | $n_6 = 1.497$ | $\nu_6 = 81.61$ |
| $r_{11} = -5.3503$ | | | |
| | $d_{11} = 0.4952$ | $n_7 = 1.74077$ | $\nu_7 = 27.79$ |
| $r_{12} = 9.0002$ | | | |
| | $d_{12} = 1.1745$ | | |
| $r_{13} = -4.3317$ | | | |
| | $d_{13} = 0.1855$ | $n_8 = 1.71736$ | $\nu_8 = 29.51$ |
| $r_{14} = 1.7362$ | | | |
| | $d_{14} = 0.7429$ | $n_9 = 1.497$ | $\nu_9 = 81.61$ |
| $r_{15} = 14.1672$ | | | |
| | $d_{15} = 0.1337$ | | |
| $r_{16} = 2.0963$ | | | |
| | $d_{16} = 1.1649$ | $n_{10} = 1.7618$ | $\nu_{10} = 27.11$ |

-continued

Embodiment 3
f = 1.0, NA = 0.5, β = −40X, IH = 1.4176

$r_{17} = -1.7501$
$d_{17} = 0.7362$   $n_{11} = 1.6935$   $\nu_{11} = 53.23$
$r_{18} = 1.2259$ $$\frac{n_4 - n_5}{r_8} = 0.0622 \qquad \frac{n_6 - n_7}{r_{11}} = 0.0456$$

$$\frac{n_9 - n_8}{r_{14}} = 0.1269$$

$\nu_4 - \nu_5 = 61.35$    $r_{13} = -4.3317$
$\nu_6 - \nu_7 = 53.82$    $r_{18} = 1.2259$
$\nu_9 - \nu_8 = 52.1$

In respective embodiments shown in the above, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, reference symbols $\nu_1$ through $\nu_{11}$ respectively represent Abbe's numbers of respective lenses, reference symbols β represents the magnification, and reference symbols IH represents the image height.

Figure 2:
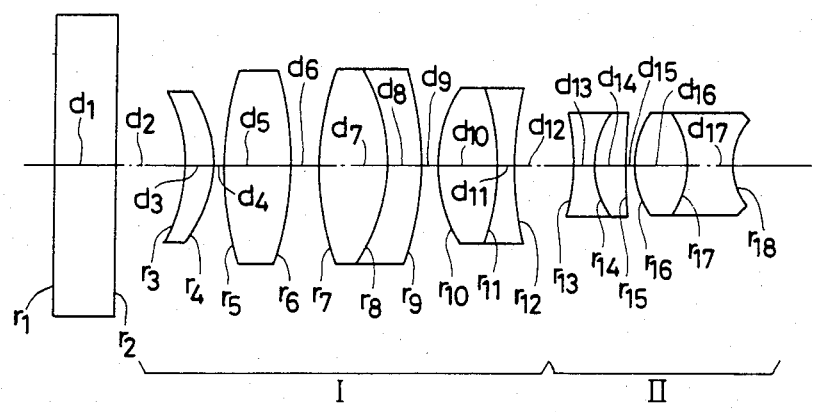
FIG. 2 shows a sectional view of the objective lens system for an endoscope according to the present invention.
Figure 3:
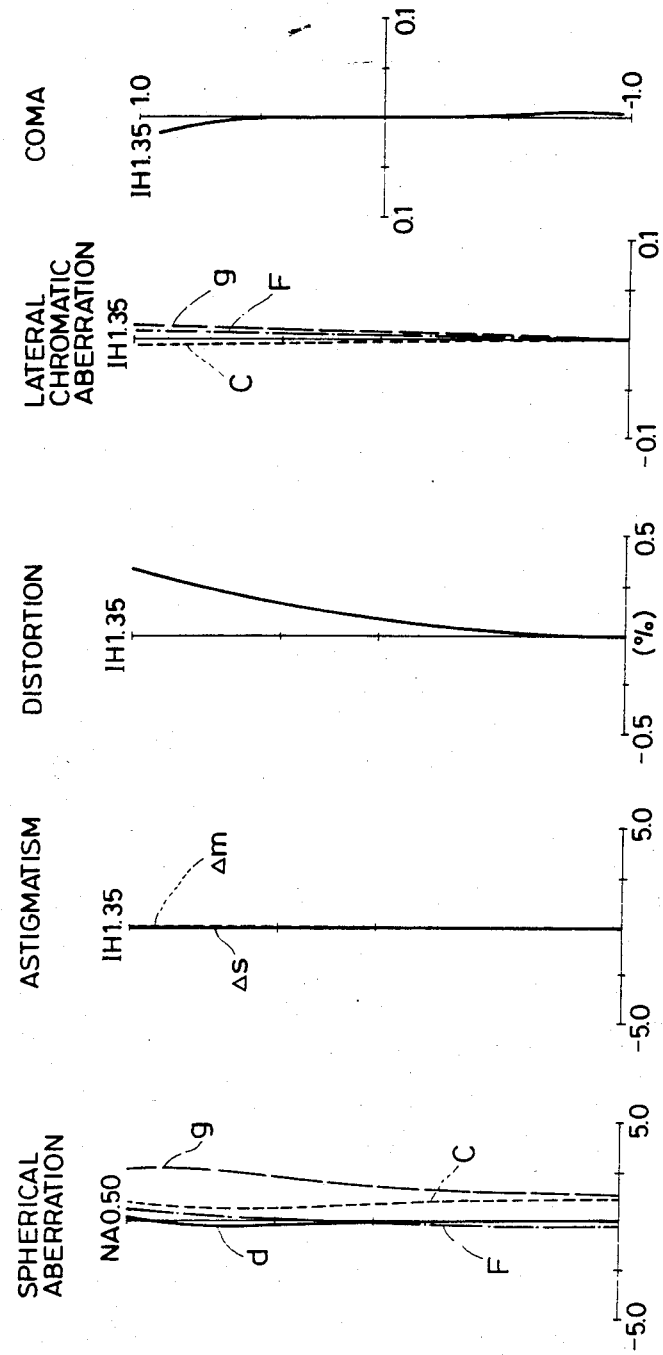
FIGS. 3, 4 and 5 respectively show graphs illustrating aberration curves of Embodiments 1, 2 and 3 of the present invention.
Figure 4:
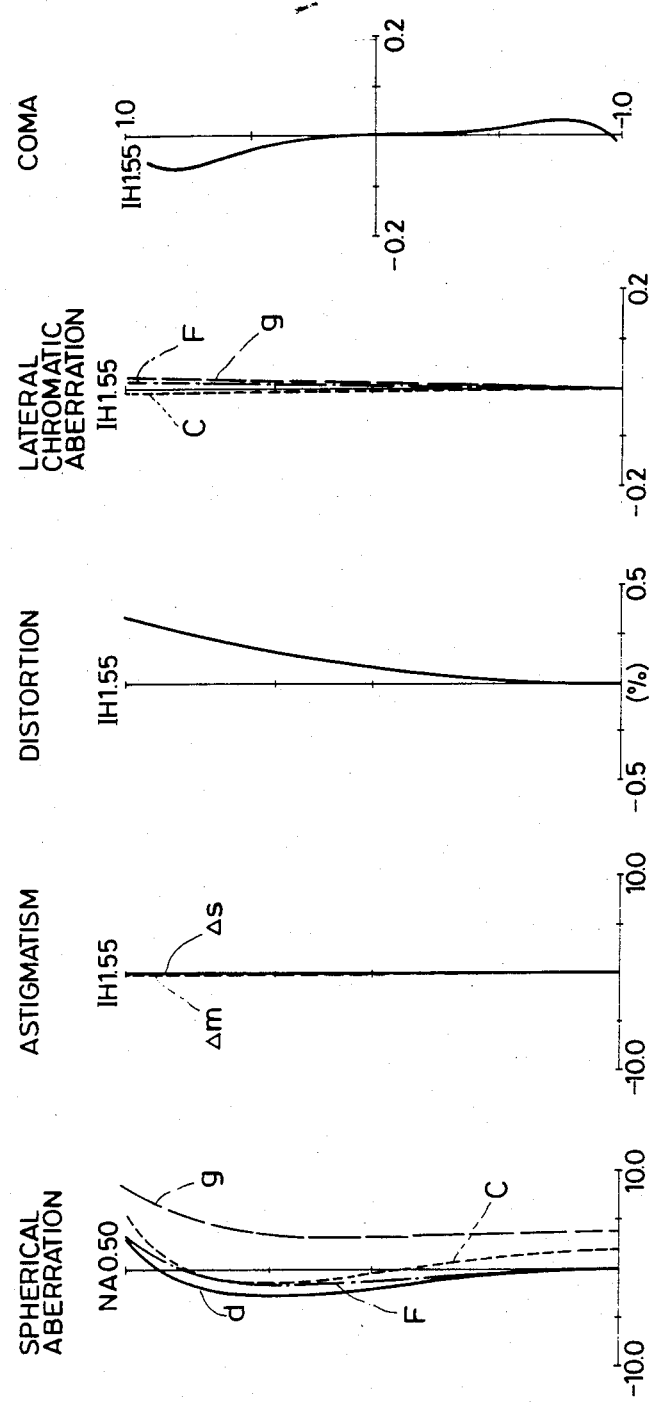
Figure 5:
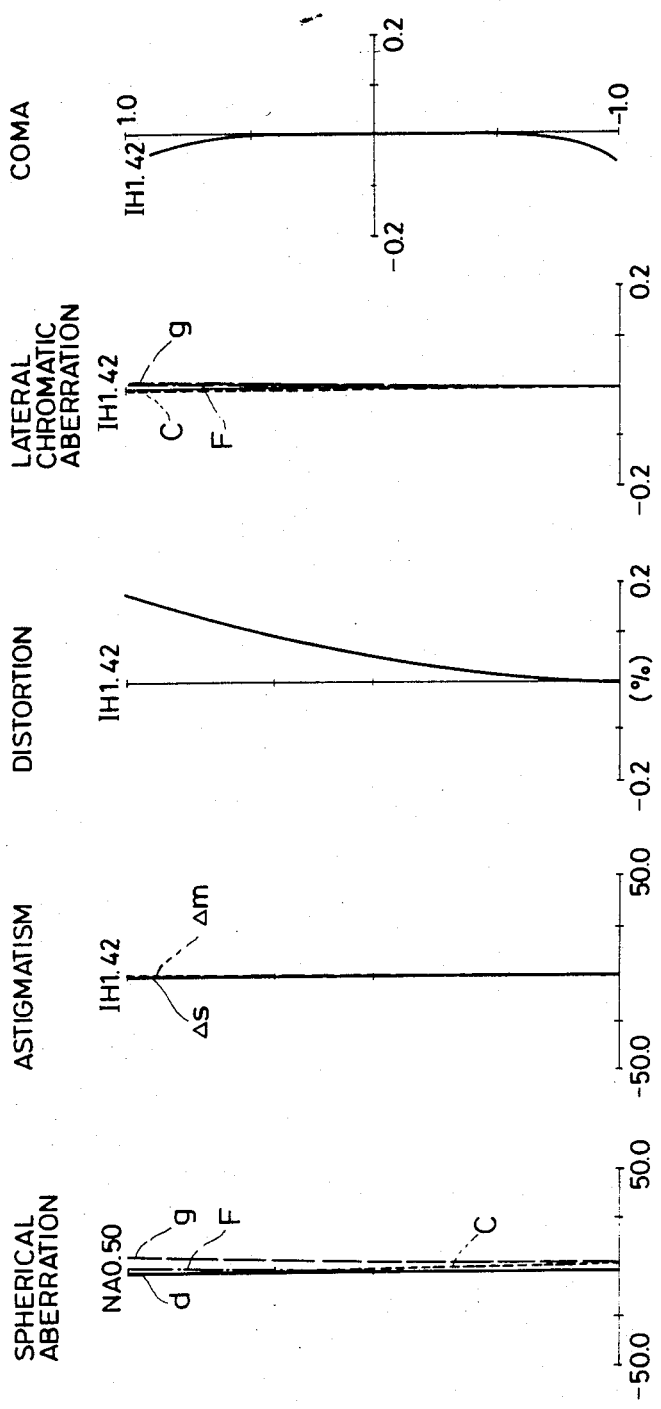

Respective embodiments shown in the above have the lens configuration as shown in FIG. 2, and a cover glass is provided on the object side of the objective lens system. The numerical data of respective embodiments shown in the above are the numerical data of the lens systems including said cover glass. In said numerical data, reference symbols $r_1$ and $r_2$ respectively represent respective surfaces of the cover glass, and reference symbol $d_1$ represents the thickness of the cover glass.

As explained so far and as it will be evident from respective embodiments, the objective lens system according to the present invention has an extremely high magnification, and aberrations thereof are corrected favorably.

I claim:

1. An objective lens system for an endoscope comprising a first lens component arranged as a positive meniscus lens concave toward the object side, a second lens component arranged as a positive lens, a third lens component arranged as a positive cemented doublet consisting of a positive lens element and a negative lens element cemented together, a fourth lens component arranged as a positive cemented doublet consisting of a positive lens element and a negative lens element cemented together, a fifth lens component arranged as a negative cemented doublet consisting of a negative lens element and a positive lens element cemented together, and a sixth lens component arranged as a negative cemented meniscus doublet consisting of a positive lens element and a negative lens element cemented together and arranged to be concave toward the image side, said objective lens system for an endoscope being arranged to fulfill the conditions (1), (2) and (3) shown below:

$$0.05/f \leq (n_4-n_5)/r_8 \leq 0.08/f \qquad (1)$$

$$0.03/f \leq (n_6-n_7)/r_{11} \leq 0.06/f \qquad (2)$$

$$0.1/f \leq (n_9-n_8)/r_{14} \leq 0.15/f \qquad (3)$$

where, reference symbol f represents the focal length of the lens system as a whole, reference symbols $n_4$ and $n_5$ respectively represent refractive indices of the lens elements on the object side and image size in the third lens component, reference symbols $n_6$ and $n_7$ respectively represent refractive indices of the lens elements on the object side and image side in the fourth lens component, reference symbols $n_8$ and $n_9$ respectively represent refractive indices of the lens elements on the object side and image side in the fifth lens component, reference symbol $r_8$ represents the radius of curvature of the cemented surface in the third lens component, reference symbol $r_{11}$ represents the radius of curvature of the cemented surface in the fourth lens component, and reference symbol $r_{14}$ represents the radius of curvature of the cemented surface in the fifth lens component.

2. An objective lens system for an endoscope according to claim 1 further fulfilling the conditions (4), (5) and (6) shown below:

$$\nu_4 - \nu_5 \geq 55 \qquad (4)$$

$$\nu_6 - \nu_7 \geq 50 \qquad (5)$$

$$\nu_9 - \nu_8 \geq 50 \qquad (6)$$

where, reference symbols $\nu_4$ and $\nu_5$ respectively represent Abbe's numbers of the lens elements on the object side and image side in the third lens component, reference symbols $\nu_6$ and $\nu_7$ respectively represent Abbe's numbers of the lens elements on the object side and image side in the fourth lens component, and reference symbols $\nu_8$ and $\nu_9$ respectively represent Abbe's numbers of the lens elements on the object side and image side in the fifth lens component.

3. An objective lens system for an endoscope according to claim 2 further fulfilling the conditions (7) and (8) shown below:

$$-5.0f \leq r_{13} \leq -3.0f \qquad (7)$$

$$1.1f \leq r_{18} \leq 1.4f \qquad (8)$$

where, reference symbol $r_{13}$ represents the radius of curvature of the surface on the object side of the fifth lens component, and reference symbol $r_{18}$ represents the radius of curvature of the surface on the image side of the sixth lens component.

4. An objective lens system for an endoscope according to claim 3 having the following numerical data:

| f = 1.0, NA = 0.5, β = −27.42X, IH = 1.3435 | | | |
|---|---|---|---|
| $r_1 = \infty$ | $d_1 = 1.385$ | $n_1 = 1.51633$ | $\nu_1 = 64.15$ |
| $r_2 = \infty$ | $d_2 = 1.7313$ | | |
| $r_3 = -3.7978$ | $d_3 = 0.7756$ | $n_2 = 1.755$ | $\nu_2 = 52.33$ |
| $r_4 = -2.5512$ | $d_4 = 0.1662$ | | |
| $r_5 = 7.9003$ | $d_5 = 1.662$ | $n_3 = 1.497$ | $\nu_3 = 81.61$ |
| $r_6 = -4.9723$ | $d_6 = 0.4571$ | | |
| $r_7 = 6.8767$ | $d_7 = 1662$ | $n_4 = 1.43389$ | $\nu_4 = 95.15$ |
| $r_8 = -3.4598$ | $d_8 = 0.6925$ | $n_5 = 1.64769$ | $\nu_5 = 33.80$ |
| $r_9 = -6.7756$ | | | |

-continued

| f = 1.0, NA = 0.5, β = −27.42X, IH = 1.3435 | | | |
|---|---|---|---|
| | d₉ = 0.4155 | | |
| r₁₀ = 3.9211 | | | |
| | d₁₀ = 1.2742 | n₆ = 1.497 | ν₆ = 81.61 |
| r₁₁ = −5.464 | | | |
| | d₁₁ = 0.554 | n₇ = 1.74077 | ν₇ = 27.79 |
| r₁₂ = 10.0734 | | | |
| | d₁₂ = 1.2881 | | |
| r₁₃ = −4.0748 | | | |
| | d₁₃ = 0.4155 | n₈ = 1.71736 | ν₈ = 29.51 |
| r₁₄ = 1.8283 | | | |
| | d₁₄ = 0.831 | n₉ = 1.497 | ν₉ = 81.61 |
| r₁₅ = 7.9155 | | | |
| | d₁₅ = 0.1385 | | |
| r₁₆ = 2.1662 | | | |
| | d₁₆ = 1.3158 | n₁₀ = 1.7618 | ν₁₀ = 27.11 |
| r₁₇ = −1.795 | | | |
| | d₁₇ = 0.8033 | n₁₁ = 1.6935 | ν₁₁ = 53.23 |
| r₁₈ = 1.2922 | | | |

$$\frac{n_4 - n_5}{r_8} = 0.0618 \qquad \frac{n_6 - n_7}{r_{11}} = 0.0446$$

$$\frac{n_9 - n_8}{r_{14}} = 0.1205$$

$$\nu_4 - \nu_5 = 61.35 \qquad r_{13} = -4.0748$$
$$\nu_6 - \nu_7 = 53.82 \qquad r_{18} = 1.2922$$
$$\nu_9 - \nu_8 = 52.1$$

where, reference symbols r₁ through r₁₈ respectively represent radii of curvature of respective lens surfaces, reference symbols d₁ through d₁₇ respectively represent thicknesses of respective lenses and airspaces between respective lenses, reference symbols n₁ through n₁₁ respectively represent refractive indices of respective lenses, reference symbols ν₁ through ν₁₁ respectively represent Abbe's numbers of respective lenses, reference symbol β represents the magnification, and reference symbol IH represents the image height.

5. An objective lens system for an endoscope according to claim 3 having the following numerical data:

| f = 1.0, NA = 0.5, β = −30.828X, IH = 1.5461 | | | |
|---|---|---|---|
| r₁ = ∞ | | | |
| | d₁ = 2.391 | n₁ = 1.51633 | ν₁ = 64.15 |
| r₂ = ∞ | | | |
| | d₂ = 1.5462 | | |
| r₃ = −4.4486 | | | |
| | d₃ = 0.8927 | n₂ = 1.755 | ν₂ = 52.33 |
| r₄ = −3.3053 | | | |
| | d₄ = 0.1914 | | |
| r₅ = 8.2555 | | | |
| | d₅ = 1.9128 | n₃ = 1.49782 | ν₃ = 66.83 |
| r₆ = −5.2121 | | | |
| | d₆ = 0.526 | | |
| r₇ = 6.5355 | | | |
| | d₇ = 1.9128 | n₄ = 1.43389 | ν₄ = 95.15 |
| r₈ = −3.662 | | | |
| | d₈ = 0.797 | n₅ = 1.65016 | ν₅ = 39.39 |
| r₉ = −7.9534 | | | |
| | d₉ = 0.4781 | | |
| r₁₀ = 4.323 | | | |
| | d₁₀ = 1.4665 | n₆ = 1.497 | ν₆ = 81.61 |
| r₁₁ = −5.534 | | | |
| | d₁₁ = 0.6377 | n₇ = 1.74077 | ν₇ = 27.79 |
| r₁₂ = 12.0791 | | | |
| | d₁₂ = 1.7534 | | |
| r₁₃ = −3.905 | | | |
| | d₁₃ = 0.4781 | n₈ = 1.71736 | ν₈ = 29.51 |
| r₁₄ = 1.6997 | | | |
| | d₁₄ = 0.9555 | n₉ = 1.497 | ν₉ = 81.61 |
| r₁₅ = 4.7794 | | | |
| | d₁₅ = 0.1572 | | |

-continued

| f = 1.0, NA = 0.5, β = −30.828X, IH = 1.5461 | | | |
|---|---|---|---|
| r₁₆ = 2.0721 | | | |
| | d₁₆ = 1.5129 | n₁₀ = 1.7618 | ν₁₀ = 27.11 |
| r₁₇ = −2.3009 | | | |
| | d₁₇ = 0.9227 | n₁₁ = 1.6935 | ν₁₁ = 53.23 |
| r₁₈ = 1.3757 | | | |

$$\frac{n_4 - n_5}{r_8} = 0.0591 \qquad \frac{n_6 - n_7}{r_{11}} = 0.044$$

$$\frac{n_9 - n_8}{r_{14}} = 0.1296$$

$$\nu_4 - \nu_5 = 55.76 \qquad r_{13} = -3.905$$
$$\nu_6 - \nu_7 = 53.82 \qquad r_{18} = 1.3757$$
$$\nu_9 - \nu_8 = 52.1$$

where, reference symbols r₁ through r₁₈ respectively represent radii of curvature of respective lens surfaces, reference symbols d₁ through d₁₇ respectively represent thicknesses of respective lenses and airspaces between respective lenses, reference symbols n₁ through n₁₁ respectively represent refractive indices of respective lenses, reference symbols ν₁ through ν₁₁ respectively represent Abbe's numbers of respective lenses, reference symbol β represents the magnification, and reference symbol IH represents the image height.

6. An objecitve lens system for an endoscope according to claim 3 having the following numerical data:

| f = 1.0, NA = 0.5, β = −40X, IH = 1.4176 | | | |
|---|---|---|---|
| r₁ = ∞ | | | |
| | d₁ = 2.006 | n₁ = 1.51633 | ν₁ = 64.15 |
| r₂ = ∞ | | | |
| | d₂ = 0.9168 | | |
| r₃ = −3.4978 | | | |
| | d₃ = 0.6996 | n₂ = 1.72916 | ν₂ = 54.68 |
| r₄ = −2.3121 | | | |
| | d₄ = 0.1337 | | |
| r₅ = 7.486 | | | |
| | d₅ = 1.1114 | n₃ = 1.497 | ν₃ = 81.61 |
| r₆ = −4.8326 | | | |
| | d₆ = 0.403 | | |
| r₇ = 5.9694 | | | |
| | d₇ = 1.4327 | n₄ = 1.43389 | ν₄ = 95.15 |
| r₈ = −3.2278 | | | |
| | d₈ = 0.4307 | n₅ = 1.64769 | ν₅ = 33.8 |
| r₉ = −5.5916 | | | |
| | d₉ = 0.4042 | | |
| r₁₀ = 3.934 | | | |
| | d₁₀ = 1.2198 | n₆ = 1.497 | ν₆ = 81.61 |
| r₁₁ = −5.3503 | | | |
| | d₁₁ = 0.4952 | n₇ = 1.74077 | ν₇ = 27.79 |
| r₁₂ = 9.0002 | | | |
| | d₁₂ = 1.1745 | | |
| r₁₃ = −4.3317 | | | |
| | d₁₃ = 0.1855 | n₈ = 1.71736 | ν₈ = 29.51 |
| r₁₄ = 1.7362 | | | |
| | d₁₄ = 0.7429 | n₉ = 1.497 | ν₉ = 81.61 |
| r₁₅ = 14.1672 | | | |
| | d₁₅ = 0.1337 | | |
| r₁₆ = 2.0963 | | | |
| | d₁₆ = 1.1649 | n₁₀ = 1.7618 | ν₁₀ = 27.11 |
| r₁₇ = −1.7501 | | | |
| | d₁₇ = 0.7362 | n₁₁ = 1.16935 | ν₁₁ = 53.23 |
| r₁₈ = 1.2259 | | | |

$$\frac{n_4 - n_5}{r_8} = 0.0622 \qquad \frac{n_6 - n_7}{r_{11}} = 0.0456$$

$$\frac{n_9 - n_8}{r_{14}} = 0.1269$$

$$\nu_4 - \nu_5 = 61.35 \qquad r_{13} = -4.3317$$

-continued

| f = 1.0, NA = 0.5, β = −40X, IH = 1.4176 | |
| --- | --- |
| ν$_6$-ν$_7$ = 53.82 | r$_{18}$ = 1.2259 |
| ν$_9$-ν$_8$ = 52.1 | | where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, reference symbols $\nu_1$ through $\nu_{11}$ respectively represent Abbe's numbers of respective lenses, reference symbol $\beta$ represents the magnification, and reference symbol IH represents the image height.

* * * * *